United States Patent Office 3,304,292
Patented Feb. 14, 1967

3,304,292
GROUP I METAL, GROUP I ALUMINUM HYDRIDE, TRANSITION METAL HALIDE FOR POLYMERIZATION OF ETHYLENE TO ETHYLENE-BUTENE COPOLYMER
Hugh J. Hagemeyer, Jr., Marvin B. Edwards, and Vernon K. Park, Longview, Tex., assignors to Eastman Kodak Company, Rochester, N.Y., a corporation of New Jersey
No Drawing. Filed Sept. 5, 1963, Ser. No. 306,680
10 Claims. (Cl. 260—88.2)

This invention relates to the polymerization of ethylene. More particularly, this invention relates to the catalytic polymerization of ethylene to form ethylene-butene copolymers. In a specific aspect, this invention relates to the catalytic polymerization of ethylene to form ethylene-butene copolymers at temperatures of at least 170° C.

Copolymers of ethylene with 1-butene have been extensively described in the literature. These copolymers exhibit a combination of properties which make them particularly useful in applications where stress crack resistance is needed. Such applications include, for example, blow molding operations, the formation of pipe, wire covering and cable jacketing. These copolymers have been prepared by several prior art methods employing a number of different catalysts. In general, the prior art methods involve a two stage operation in which the butene is first prepared separately, purified and then copolymerized with ethylene. Such processes, since they require a separate preparation and purification of 1-butene, are expensive, time consuming, and involve difficult handling problems. In addition, these prior art processes require very close mechanical regulation to control the feed of 1-butene into the polymerization reactor in order to regulate the 1-butene content of the copolymer.

More recently, two stage processes for the preparation of ethylene 1-butene copolymers have been developed. In such a process, ethylene is first dimerized in the presence of a suitable catalyst, for example, nickel oxide, and then copolymerized with ethylene using a catalyst suitable for this purpose. However, such a process is subject to the disadvantages inherent in the use of a dual catalyst system such as purification, as well as the obvious problems of controlling such a reaction system.

In an attempt to overcome the disadvantages of two stage processing, ethylene-butene copolymers have been prepared from monomeric ethylene at low temperatures, for example, 55°–65° C., in a single stage operation using catalysts comprising aluminum alkyls, titanium esters and titanium halides. However, these low temperature processes have the disadvantages of slow rates of polymerization, poor heat transfer, occlusion of the catalyst to the stirrer and reactor walls giving poor polymer-to-catalyst yields and difficult and incomplete removal of catalytic components, even after exhaustive alcoholic washes.

It is evident therefore, that the state of the art will be greatly enhanced by a single stage process which avoids the disadvantages of the prior art methods discussed above.

Accordingly, it is an object of this invention to provide an improved process for the preparation of ethylene-butene copolymers.

It is another object of this invention to provide a process for the preparation of ethylene-butene copolymers which avoids the aforementioned disadvantages of prior art methods ordinarily employed for their preparation.

It is another object of this invention to provide a process for the formation of ethylene-butene copolymers using ethylene as the sole initial reactant.

Another object of this invention is to provide a process for the preparation of copolymers of ethylene with butene, which process provides fast polymerization rates, high polymer-to-catalyst yields and simple and substantially complete removal of catalyst residue from the polymer.

Another object of this invention is to provide a process for the preparation of ethylene-butene copolymers in which the composition of the copolymer is easily controlled without the aid of mechanical regulating devices.

Other objects will be apparent from the description and claims that follow.

In accordance with this invention, ethylene-butene copolymers are prepared by contacting ethylene at a temperature in the range of about 170° to about 300° C. with a catalyst composition comprising an alkali metal, an alkali metal aluminum hydride, a subhalide of titanium, vanadium, chromium, molybdenum or tungsten, and, in some instances, alkali metal fluorides, magnesium oxide or calcium oxide.

It has been found that the temperature employed in practicing this invention has a significant effect. Thus, at temperatures below about 170° C., only linear polyethylene is formed. In contrast, at temperatures above about 170° C., the ethylene-butene copolymer is prepared. Furthermore, it has been found that, as the temperature is increased above about 170° C., the butene content of the resulting copolymer also increases, offering easy control of the polymer composition. This permits the preparation of ethylene-butene copolymers having any desired composition without the use of mechanical regulating devices. For example, when operating according to the process of this invention, the 1-butene content of the copolymer can be increased from about .4%, or less, by weight, at a temperature of 170° C., to about 6.6%, by weight, at a temperature of 240° C. The percent by weight of 1-butene at 180°, 200°, 210° and 220° C. being 1.3, 3.0, 3.9, and 4.8 respectively.

As already indicated, the process employed in the practice of this invention is a high temperature process. Such a high temperature process offers a number of significant advantages over polymerization processes carried out at lower temperatures, for example, 100° C. or below. Thus, in many lower temperature processes the polymer forms a deposit on the catalyst which causes inactivation, and particularly where the polymerization is carried out in a solvent medium, the polymerization mixture becomes too viscous for adequate agitation before the catalyst is exhausted with a resultant loss in the economy of the process and a necessity for removing large amounts of residual catalyst from the resulting polymer. Furthermore, at high temperatures the induction period of the catalyst is substantially eliminated and at these high temperatures the polymer is in solution which makes it possible to simply filter it to remove residual catalyst and obtain a polymer with residual ash contents low enough to be satisfactory for most commercial uses. In contrast, it is exceedingly difficult to separate a solid by mechanical reaction and extraction which must be used when the polymer is formed at low temperature in a slurry type of process.

One component of the catalyst mixture is an alkali metal, the preferred metal being lithium, although other alkali metals, for example, sodium, potassium, rubidium, or cesium can be employed with satisfactory results. The alkali metals with atomic weights below about 39, i.e., lithium, sodium and potassium, are particularly effective catalyst components. The second component of the catalyst mixture is an alkali metal aluminum hydride. The alkali metal aluminum hydrides are well known compounds and include, for example, sodium aluminum hydride, lithium aluminum hydride and the like. Any of the alkali metal aluminum hydrides can be employed with good results, although lithium aluminum hydride is preferred. The third component of the catalyst which must be employed is a polyhalide of a transition metal selected from the group consisting of titanium, vanadium, molybdenum and tungsten. The valence of the transition metal in the halide is at least one less than maximum. Thus, such transition metal subhalides as titanium trichloride, titanium tribromide, vanadium dibromide, vanadium dichloride, molybdenum dichloride, molybdenum trichloride, tungsten dibromide, and the like, are employed in the practice of this invention. For the most desirable results it is preferred to use the chloride of one of the aforementioned transition metals and particularly a chloride of titanium, for example, titanium trichloride.

In order to increase the stereospecificity of the catalyst it is also possible to employ certain basic compounds as fourth components in the catalyst. It is not absolutely necessary that such compounds be employed but their inclusion has been found to be advantageous. Compounds which can be employed for this purpose include alkali metal fluorides such as sodium, lithium, or potassium fluorides as well as calcium or magnesium oxide. One or more of the components from each group can be employed as long as at least one of each of said components 1-3 is employed. The catalyst components can be added to one another in any order although it is preferred that the alkali metal and alkali metal aluminum hydrides be mixed prior to addition to the transition metal subhalide.

The relative proportions of the various catalyst components can be varied over a wide range. The mole ratio of alkali metal to alkali metal aluminum hydride is generally in the range of about 0.1:1 to about 5:1, preferably about 0.5:1 to about 2:1. The mole ratio of alkali metal aluminum hydride to transition metal halide is generally 0.25:1 to about 3:1, preferably about 0.5:1 to about 1.5:1. When the aforementioned basic compounds are employed as fourth components of the catalyst, they are used in up to equimolar amounts with the transition metal halide. Although an excess of transition metal halide will give good results, for example, a mole ratio of basic compound to transition metal halide of 1:10, the mole ratio of basic compound to transition metal halide should not be greater than 1:1.

Although the temperature employed in the polymerization process is generally above about 170° C. temperatures in the range of about 170° to about 300° C. are most often employed. For the most desirable results, temperatures in the range of about 180° to about 260° C. are employed. At these temperatures the pressures employed will be from about atmospheric to about 2,000 atmospheres. However, since it is desirable to employ a solution of the monomer in relatively high concentration, the process is desirably effected at a pressure of about 200 to 2,000 p.s.i.g. obtained by pressuring the system with the monomer being polymerized. Under these conditions of reaction, good results are generally obtained with a concentration of catalyst from about 0.01% to about 5%, by weight, based on monomer being polymerized. The concentration of the monomer in the vehicle employed, if any, will vary widely depending upon the reaction conditions and will usually range from about 2 to about 50%, by weight.

The polymerization time will usually vary from a period of a few minutes or hours to several days. When a continuous process is employed the contact time in the polymerization zone can be regulated as desired. In most cases it is not necessary to employ reactor contact times much beyond one-half hour to one hour since a cyclic system can be employed involving filtration of the polymer and return of the vehicle and unused catalyst to the charge zone wherein make up catalyst can be added and monomer introduced. The properties of the copolymer prepared under these conditions will vary somewhat with the butene content; copolymers containing less than 15% butene tending to resemble polyethylene, while those having higher butene contents, for example, 30%, or higher, tend to be rubbery or elastic in their properties. The copolymers prepared according to the process of this invention can contain less than 1% of butene-1 to more than 95%, with copolymers containing less than 10% butene-1 being readily obtainable.

The polymerization reaction can be carried out in the presence or absence of a liquid organic vehicle. When the polymerization is carried out in the presence of a liquid organic vehicle any of the conventional organic liquids which contain no oxygen and which are free of water, ether, or other compounds containing oxygen can be employed. For example, the organic vehicle can be aliphatic alkane or cycloalkane such as pentane, hexane, heptane or cyclohexane, or a high molecular weight liquid paraffin or mixture of paraffins which are liquid at reaction temperature, or an aromatic hydrocarbon such as benzene, toluene, xylene or the like or a halogenated aromatic compound such as chlorobenzene or chloronaphthalene. However, good results can be obtained when the liquid organic vehicle is dispersed with and the polymerization carried out in the presence of a gas such as compressed ethylene.

The polymerization is ordinarily accomplished by merely admixing the components of the polymerization mixture and heating to the desired polymerization temperature. This temperature is maintained by heating and cooling as required. The process can be run in a batch or continuous manner. The catalyst components are usually mixed with each other prior to use in the reaction and any order of addition of the various components of the mixture can be used. Lithium aluminum hydride and the transition element halide can be mixed separately or in the presence of the alkali metal and/or basic compound if the latter is employed. The transition element halide is preferably the chloride and it is desirable that the transition element halide be in a reduced form before the catalyst complex is prepared. However, the catalyst mixture can be prepared with the transition element halide in the maximum state of oxidation and at least partial reduction will be obtained by reaction with a portion of the alkali metal aluminum hydride and/or alkali metal. Formation of the catalyst complex can then be completed with additional alkali metal and alkali metal aluminum hydride. As already indicated, an alkali metal fluoride, magnesium oxide or calcium oxide can also be added. Particularly good results can be obtained by washing the catalyst complex with an organic liquid such as the reaction vehicle until it is substantially free of unreacted halogen.

This invention can be further illustrated by the following examples of preferred embodiments thereof although it will be understood that these examples are included merely for purposes of illustration and are not intended to limit the scope of the invention unless otherwise specifically indicated.

*Example 1*

Copolymers of ethylene with 1-butene can be prepared at temperatures of at least about 170° C. using the catalyst described hereinabove. Thus, a catalyst of 9 g.

Li, 12.4 g. LiAlH₄, 100 g. TiCl₃, and 27 g. NaF (mole ratio 2:0.5:1:1) is charged to an 80-gallon stirred reactor containing 40 gallons of mineral spirits. The autoclave is pressured to 400 p.s.i.g. with ethylene, and the polymerization temperature controlled at 200° C. At the end of 12 hours the autoclave is discharged through a filter which removes the catalyst. The polymer solution is concentrated by stripping out mineral spirits with hot ethylene at 220° C. The molten polymer containing 25% residual solvent is extruded into water and chopped into pellets. Residual solvent is extracted with hexane at 68° C. The yield of ethylene–1-butene copolymer is 72 pounds. Infrared spectrum of this polymer indicates 3.0% 1-butene. Density of this copolymer is 0.9510 and the melt index is 2.30. In contrast, a repeat of this procedure at temperatures below about 170° C. gives polyethylene as indicated by its infrared spectrum.

*Example 2*

The catalyst employed in the practice of this invention need not contain an alkali metal fluoride, magnesium oxide or calcium oxide. To illustrate, a two-liter stirred autoclave is charged with 3.0 g. sodium metal, 0.75 g. LiAlH₄, 3.0 g. TiCl₃, and 500 ml. odorless mineral spirits. The autoclave is sealed, purged with ethylene, heated to 220° C., and pressured to 1000 p.s.i.g. with ethylene. The polymerization reaction is allowed to continue 2.5 hours. A yield of 100 grams of ethylene–1-butene copolymer containing 5.0% 1-butene is obtained. This copolymer has a density of 0.9490 and a melt index of 0.028.

*Example 3*

Ethylene can be polymerized with catalyst comprising lithium, lithium aluminum hydride, and titanium trichloride of various molar ratios and at temperatures in the range of 170° to 300° C. to give crystalline ethylene–1-butene copolymers having good toughness, tensile strength and high notched Izod impact strength. To illustrate, several ethylene–1-butene copolymers are prepared in a continuous system employing two 500-gallon stirred reactors in series. In the first stirred tubular reactor is charged mineral spirits solvent, ethylene, and catalyst. The catalyst employed comprises lithium, lithium aluminum hydride, titanium trichloride, and sodium fluoride in 5:1:1:1 molar ratio. The reaction conditions are 1000 p.s.i.g. at temperatures of 175°–235° C. The feed rates for the various streams are adjusted to give a polymer content of 10–15%. The effluent from the first reactor passes to the second stirred tubular reactor where additional solvent and ethylene are added at rates to maintain solids at 15–25% and ethylene at 12–24%.

From the second reactor the polymer solution is let down to a dilution tank at 50 p.s.i.g. where unreacted ethylene is flashed off and recycled. Mineral spirits is added to yield a 3% solution. The 3% dope is filtered to remove catalyst, and the polymer solution is concentrated by stripping with hot ethylene at 200° C. The polymer is then extruded into water and chopped into ⅛-inch pellets. The pellets are extracted with hexane at 69° C. for 15 hours to remove residual solvent and dried. The yield of crystalline ethylene–1-butene copolymer is 88–98%. The properties of several copolymers made using the above procedure are set forth in Table 1 which follows.

TABLE 1

| Run | 1 | 2 | 3 | 4 |
|---|---|---|---|---|
| 1-butene, percent | 5.9 | 4.7 | 2.8 | 0.6 |
| Reaction Temperature, °C | 235 | 225 | 200 | 175 |
| Melt Index at 190° C. and 2,160 g. load | 9.93 | 1.39 | 6.2 | 0.64 |
| Density | 0.9367 | 0.9398 | 0.9533 | 0.9615 |
| Brittleness Temperature, °C | −78 | −78 | −78 | −78 |
| Tensile Strength at 2″/min.: | | | | |
| At Fracture | 1,440 | 1,650 | 2,550 | 3,180 |
| At Yield | 2,530 | 2,320 | 3,030 | 3,810 |
| Elongation | 217 | 667 | 1,183 | 900 |
| Stiffness in Flexure | 52,700 | 49,800 | 67,200 | 93,000 |
| Vicat Softening Point, °C | 109 | 112 | 120.1 | 122.5 |
| Hardness, Rockwell R scale | 14 | 14 | 37 | 54 |
| Izod Impact Strength at 23° C.: | | | | |
| Notched | 0.86 | 2.20 | 0.73 | Twist break |
| Unnotched | Twist | Twist | Twist | Twist |

When the runs are repeated at temperatures of 160, 165 and 168° C. there is no butene-1 detected in the infrared spectrum of the resulting polymer which is identified as polyethylene.

*Example 4*

A series of runs are made in a two-liter stirred autoclave to produce ethylene–1-butene copolymers from monomeric ethylene using several different combinations of alkali metal, alkali metal aluminum hydride, and transition metal halide. The catalyst charge is 4.5 g. in each run. The results are as follows:

TABLE 2

| Catalyst Components | Mole Ratio of Components | Temperature, °C. | Pressure, p.s.i.g. | Solvent | Yield | Percent 1-Butene | Melt Index |
|---|---|---|---|---|---|---|---|
| Li, LiAlH₄, VCl₃ | 2:1:1 | 230 | 1,000 | Xylene | 205 | 5.5 | 2.5 |
| Li, NaAlH₄, VCl₃ | 4:1:1 | 220 | 1,000 | Mineral Spirits | 196 | 4.2 | 1.4 |
| K, LiAlH₄, TiCl₃ | 2:1:1 | 200 | 1,000 | Cyclohexane | 150 | 2.5 | 0.4 |

When each of the above runs are repeated at 165° C., only polyethylene is obtained.

Thus, by the practice of this invention there is provided to the art a simple, direct and economic process for the preparation of ethylene–1-butene copolymers using ethylene as the sole reactant. The ethylene butene copolymers are known compounds which are particularly useful in the preparation of wire covering and cable jacketing.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The method for the preparation of ethylene-butene copolymer which comprises contacting ethylene, at a temperature in the range of about 170° to about 300° C. with a catalyst consisting essentially of (1) an alkali metal, (2) an alkali metal aluminum hydride, (3) a subhalide of a transition metal selected from the group consisting of titanium, vanadium, chromium, molybdenum and tungsten, and (4) a basic compound selected from the group consisting of alkali metal fluorides, magnesium oxide and calcium oxide, the mole ratio of alkali metal to alkali metal aluminum hydride being in the range of about 0.1:1 to about 5:1, the mole ratio of alkali metal aluminum hydride to transition metal halide being in the range of about 0.25:1 to about 3:1 and the mole ratio of basic compound to transition metal halide being no greater than about 1:1.

2. The process according to claim 1 in which the temperature is in the range of about 180° to about 260° C.

3. The method for the preparation of ethylene-butene copolymer which comprises contacting ethylene, at a temperature in the range of about 170° to about 300° C., with a catalyst consisting essentially of (1) lithium, (2) lithium aluminum hydride. (3) titanium trichloride, and (4) sodium fluoride, the mole ratio of lithium to lithium aluminum hydride being in the range of about 0.1:1 to about 5:1, the mole ratio of lithium aluminum hydride to titanium trichloride being in the range of 0.25:1 to about 3:1 and the mole ratio of sodium fluoride to titanium trichloride being no greater than about 1:1.

4. The method for the preparation of ethylene-butene copolymer which comprises contacting ethylene, at a temperature in the range of about 170° to about 300° C. with a catalyst consisting essentially of (1) lithium, (2) lithium aluminum hydride, and (3) titanium trichloride, the mole ratio of lithium to lithium aluminum hydride being in the range of 0.1:1 to about 5:1 and the mole ratio of lithium aluminum hydride to titanium trichloride being in the range of about 0.25:1 to about 3:1.

5. The method for the preparation of ethylene-butene copolymer which comprises contacting ethylene at a temperature in the range of about 180° to about 260° C. with a catalyst consisting essentially of (1) lithium, (2) lithium aluminum hydride, and (3) titanium trichloride, the mole ratio of lithium to lithium aluminum hydride being in the range of about 0.1:1 to about 5:1 and the mole ratio of lithium aluminum hydride to titanium trichloride being in the range of about 0.25:1 to about 3:1.

6. The method for the preparation of ethylene-butene copolymer which comprises contacting ethylene at a temperature in the range of about 180° to about 260° C. with a catalyst consisting essentially of (1) sodium, (2) lithium aluminum hydride, and (3) titanium trichloride, the mole ratio of sodium to lithium aluminum hydride being in the range of about 0.1:1 to about 5:1 and the mole ratio of lithium aluminum hydride to titanium trichloride being in the range of about 0.25:1 to about 3:1.

7. The method for the preparation of ethylene-butene copolymer which comprises contacting ethylene at a temperature of about 200° C. with a catalyst consisting essentially of (1) lithium, (2) lithium aluminum hydride, (3) titanium trichloride, and (4) sodium fluoride in a mole ratio of about 2:0.5:1:1.

8. The method for the preparation of ethylene-butene copolymer at a temperature of about 230° C. with a catalyst consisting essentially of (1) lithium, (2) lithium aluminum hydride, and (3) vanadium trichloride in a mole ratio of about 2:1:1.

9. The method for the preparation of ethylene-butene copolymer which comprises contacting ethylene at a temperature of about 220° C. with a catalyst consisting essentially of (1) lithium, (2) sodium aluminum hydride, and (3) vanadium trichloride in a mole ratio of about 4:1:1.

10. The method for the preparation of ethylene-butene copolymer which comprises contacting ethylene at a temperature of about 200° C. with a catalyst consisting essentially of (1) potassium, (2) lithium aluminum hydride, and (3) titanium trichloride in a mole ratio of about 2:1:1.

No references cited.

JOSEPH L. SCHOFER, *Primary Examiner.*

JAMES A. SEIDLECK, *Examiner.*

M. B. KURTZMAN, *Assistant Examiner.*